(12) United States Patent
Sutherland et al.

(10) Patent No.: US 12,228,164 B2
(45) Date of Patent: Feb. 18, 2025

(54) TANGENTIAL PIN CONNECTION

(71) Applicant: Kaizen Well Solutions Ltd., Red Deer (CA)

(72) Inventors: Michael T. Sutherland, Calgary (CA); Clint Mason, Carstairs (CA); Kelly John Mason, Starland County (CA); Timothy Dean Hadland, Sylvan Lake (CA)

(73) Assignee: KAIZEN WELL SOLUTIONS LTD., Red Deer (CA)

( * ) Notice: Subject to any disclaimer, the term of this patent is extended or adjusted under 35 U.S.C. 154(b) by 361 days.

(21) Appl. No.: 17/861,661

(22) Filed: Jul. 11, 2022

(65) Prior Publication Data
US 2023/0009014 A1    Jan. 12, 2023

Related U.S. Application Data

(60) Provisional application No. 63/219,982, filed on Jul. 9, 2021.

(51) Int. Cl.
| | | |
|---|---|---|
| *F16B 39/04* | (2006.01) | |
| *E21B 21/12* | (2006.01) | |
| *E21B 34/14* | (2006.01) | |
| *E21B 43/12* | (2006.01) | |
| *F16B 21/12* | (2006.01) | |

(52) U.S. Cl.
CPC .............. *F16B 39/04* (2013.01); *E21B 34/14* (2013.01); *E21B 43/121* (2013.01); *F16B 21/12* (2013.01)

(58) Field of Classification Search
CPC .......... F16B 39/04; F16B 21/12; E21B 34/14; E21B 43/121
See application file for complete search history.

(56) References Cited

U.S. PATENT DOCUMENTS

| | | | |
|---|---|---|---|
| 3,494,417 A | 2/1970 | Fredd | |
| 4,399,871 A * | 8/1983 | Adkins | E21B 34/06 137/539.5 |
| 4,757,860 A | 7/1988 | Reimert | |
| 5,090,852 A * | 2/1992 | Dixon | F16B 19/05 411/361 |

(Continued)

FOREIGN PATENT DOCUMENTS

CN           105649568 A      6/2016

OTHER PUBLICATIONS

"Subsea Wellhead System", https://www.dril-quip.com/resources/catalogs/01.%20SS-15%20Bigbore%20II%20Wellhead%20System.pdf, 2015.

(Continued)

*Primary Examiner* — James M Hewitt, II
(74) *Attorney, Agent, or Firm* — Justin R. Jackson; Peacock Law P.C.

(57) ABSTRACT

A strong connection that ensures alignment between components and which is capable of being used for high-pressure applications. The connection is held together with one or more pins that are positioned tangentially along the interfacing plane of the components and which pins are positioned such that they are placed in sheer along a significant portion of their length instead of merely across their diameter. The pins can be held in place with one or more structures, which can include threaded fasteners, to prevent the pins from being inadvertently removed.

10 Claims, 4 Drawing Sheets

(56) References Cited

U.S. PATENT DOCUMENTS

| | | | | |
|---|---|---|---|---|
| 7,198,465 | B1* | 4/2007 | Ichiryu | F01D 25/243 |
| | | | | 415/214.1 |
| 8,322,432 | B2 | 12/2012 | Bailey et al. | |
| 11,448,035 | B1* | 9/2022 | Allumbaugh | E21B 33/13 |
| 2005/0006098 | A1* | 1/2005 | Hoffman | E21B 43/26 |
| | | | | 166/305.1 |
| 2005/0241819 | A1* | 11/2005 | Victor | E21B 43/121 |
| | | | | 166/68 |
| 2007/0228728 | A1* | 10/2007 | Webb | F16L 21/08 |
| | | | | 285/305 |
| 2017/0267340 | A1* | 9/2017 | Bergeson | B64C 27/51 |

OTHER PUBLICATIONS

"TQ Lock", https://gflow.ca/lock-mandrels/165-tq-lock.html, Mar. 5, 2021.

* cited by examiner

TANGENTIAL PIN CONNECTION

CROSS-REFERENCE TO RELATED APPLICATIONS

This application claims priority to and the benefit of the filing of U.S. Provisional Patent Application No. 63/219,982, entitled "Radial Flow Plunger Lift Lubricator and Tangential Pin Connection", filed on Jul. 9, 2021, and the specification thereof is incorporated herein by reference.

BACKGROUND OF THE INVENTION

Embodiments of the present invention relate to a tangential pin connection to hold a pair of high-pressure components together. More particularly, an embodiment of the present invention relates to a plunger lift lubricator body having an upper and lower body portion which are held together by one or more pins that are arranged tangentially to an interfacing area of upper and lower body portions.

Known high-pressure connection assemblies typically rely on threaded fasteners whereby a first component screws into or onto a second component. Such a connection assembly is often susceptible to leaks and can be difficult to assemble and/or disassemble—especially after the two parts have been joined for quite some time. In addition, threaded assemblies are susceptible to cross-threading, which can permanently damage the connection and one or both of the two components. Other known attachment systems rely on a pair of mating flange plates whereby numerous bolts are used to hold the two flanges together. Such connections are bulky, time consuming and require that a predetermined torque pattern and torque value be met. Still further, known plunger lift lubricator bodies are typically held together. There is thus a present need for a connection configuration which enables an upper and lower plunger lift lubricator (or other high-pressure wellhead components) to have a very strong connection which both ensures alignment of the components and which is easy to assemble and disassemble.

BRIEF SUMMARY OF EMBODIMENTS OF THE PRESENT INVENTION

Embodiments of the present invention relate to a connection assembly having a first high-pressure portion, a second high-pressure portion, the first high-pressure portion configured to be inserted into the second high-pressure portion such that a mating interface is formed between the first high-pressure portion and the second high-pressure portion, at least one opening disposed within the second high-pressure portion, the opening positioned such that a primary axis of the opening passes tangentially through the mating interface of the first high-pressure portion and the second high-pressure portion, and at least one pin formed from a material having a yield strength of at least 20 thousand pounds per square inch ("KSI"). The at least one opening can include at least two openings and each of the at least two openings can be respectively positioned such that a primary axis of the at least two openings passes tangentially through the mating interface of the first high-pressure portion and the second high-pressure portion. The at least one pin can include dimensions that allow it to be at least partially disposed within the at least one opening.

In one embodiment, the connection assembly can further include at least one structure to prevent the at least one pin from passing completely through the at least one opening, which structure can optionally include a threaded fastener. The at least one pin can include threads disposed on at least one end portion thereof. The at least one opening disposed within the second high-pressure portion can include threads disposed therein. The connection assembly can include at least a portion of a plunger lift lubricator. The first portion can include an upper body of the plunger lift lubricator and the second portion can include a lower body of the plunger lift lubricator. The at least one pin can be a steel having a yield strength of at least 45 KSI. In one embodiment, the at least one pin is not formed from a plastic material and/or is not formed from aluminum.

Embodiments of the present invention also relate to a method for creating a high-pressure connection including providing a first high-pressure portion, providing a second high-pressure portion, inserting the first high-pressure portion into an opening within the second high-pressure portion, and inserting at least one pin within an opening of the second high-pressure portion such that the pin is positioned with its primary axis tangential to interfacing surfaces of the first high-pressure portion and the second high-pressure portion.

The method can also include securing the at least one pin such that it does not slide out of the opening of the second high-pressure portion. Optionally, securing the at least one pin can include securing the at least one pin with a threaded fastener. Inserting at least one pin can include inserting two pins within respective openings of the second high-pressure portion such that the two pins are positioned with their respective primary axis tangential to interfacing surfaces of the first high-pressure portion and the second high-pressure portion. Optionally, inserting at least one pin can include inserting at least one pin having a yield strength of at least 45 KSI, and/or inserting at least one steel pin. Providing a first high-pressure portion can include providing an upper lubricator body and providing a second high-pressure portion can include providing a lower lubricator body. providing a first high-pressure portion can include providing a first portion of a fracking unit. Providing a first high-pressure portion can include providing a first high-pressure portion configured to withstand at least 5,000 pounds per square inch gauge pressure.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
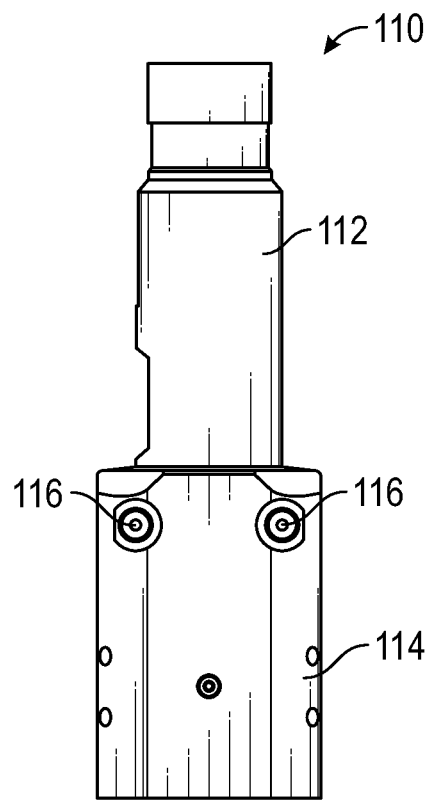
FIG. 1 is a drawing which illustrates a front view of a plunger lubricator block body that is connected using a connection apparatus according to an embodiment of the present invention.

Referring now to the figures, connection assembly 110 can include first portion 112, and second portion 114. First portion 112 and second portion 114 are preferably configured to be locked together and held in place via a plurality of pins 116, which are preferably inserted into holes 118 after first portion 112 is inserted into second portion 114. Upon insertion, pins 116 pass through respective grooves 120 in first portion 112. By inserting pins 116 into holes 118 and thus inside of grooves 120, when an internal pressure is applied, which tends to force first portion 112 away from second portion 114, the shear area of pins 116 that must be overcome to result in a failure is much more significant according to embodiments of the present invention than is the case with a conventional bolt or straight interference pin shear. Tangentially positioned pins 116 present a significant shear area as they are forced to shear down their widest point and along a significant portion of their length—instead of merely across their cross-sectional area as is the case for a conventional interference pin and/or bolt configuration.

As used throughout this application, the term "high-pressure" is intended to mean any pressure greater than 2,000 pounds per square inch gauge ("psig"). In one embodiment, the term "high-pressure" can mean pressures of greater than 5,000 psig. In one embodiment, "high-pressure" can mean pressures of greater than 10,000 psig. Still further, although terms "upper" and/or "lower" are used to describe relative positioning and to provide a better frame of reference for understanding embodiments of the present invention, it is to be understood that embodiments of the present invention are not limited to such orientations, positions, and directions and that depending on orientation and/or placement of the various components, any other desired orientation of portions of the present invention can be achieved.

For embodiments wherein connection assembly 110 comprises a plunger lift lubricator, first portion 112 can comprise an upper lubricator body and second portion 114 can comprise a lower lubricator body.

Embodiments of the present invention thus provide a high-pressure seal connection with extreme strength while maintaining serviceability. Embodiments of the present invention also allow a larger inside diameter of first portion 112 to be inserted into second portion 114 without increasing the size of second portion 114. Still further, the connection is simple to effect and does not require that torque specifications be met for proper assembly, as is the case for traditional bolted configurations. Although this application describes the use of connection assembly 110 as being particularly desirable for connecting an upper lubricator body to a lower lubricator body and the figures illustrate that, connection assembly 110 can be used to connect other components together at or near a wellhead. For example, embodiments of the present invention can be used such that connection assembly 110 comprises portions of, and is used to hold components together for, one or more of the following: plunger lift lubricators, rod stuffing boxes, wellhead connections/night caps, soap stick injections, wireline or slackline coil tubing lubricators, hydraulic rod pump heads, pressure receivers, sand and/or flow diffusers, devices that are configured to couple to a wellhead, including but not limited to a plunger lift lubricator, devices that are connected within the flow path or as part of a well fracking truck or device, devices that are within the path of fluid from a high-pressure pump, combinations thereof and the like.

Still further by using a pair of pins to secure first portion 112 within second portion 114, the resulting components can be manufactured at less cost while having increased strength and are easier to assemble and disassemble than a conventional threaded or bolted connection. Because of the ease in assembling and disassembling the resulting connection, the inspection and/or maintenance of the resulting product is simplified.

In addition to providing a strong connection, the use of pins 116 that are inserted in holes 118 and grooves 120 ensures that first portion 112 is aligned with second portion 114. Pins 116 are preferably positioned such that they create an interference and are tangential to the circumference of the connection, for round connections, or such that a primary axis of each of pins 116 lies at least substantially along a plane formed by the mating surfaces of the upper and lower bodies or other components. Thus, in one embodiment, the term "tangential" and/or "tangentially" is intended to include not only its ordinary meaning, but also configurations wherein a primary axis of a pin is arranged at least substantially parallel with an interfacing plane of mating surfaces. Further, it is to be understood that the portions of the interfacing area of the first and second high-pressure portions have groove 120 disposed therein and as such at that location of the interface, the upper and the lower portions do not actually touch to form a plane, however, when referring to the interfacing plane throughout this application, as to placement and/or alignment of a pin, it is to be understood that the "interfacing plane" is the location where the first and second portions would exist if groove 120 were not disposed therein. Pins 116 can be formed from any desirable material, but in one embodiment are preferably formed from material that is resistant to shear forces applied to the pins within the working pressure of the application. In one embodiment, pins 116 are not formed from a material having a yield strength of less than 20 thousand pounds per square inch ("KSI"). In one embodiment, pins 116 are not formed from a plastic. In one embodiment, pins 116 are not formed from aluminum. In one embodiment, pins 116 are formed from a material having a yield strength of at least 45 KSI. In one embodiment, pins 116 are formed from steel. When connection assembly 110 is used to hold an upper plunger lift lubricator body to a lower plunger lift lubricator body, pins 116 transfer forces within first portion 112 into second portion 114.

Pins 116 function by providing an interference area to stop the separation of first portion 112 from second portion 114. Still further, internal pressure between first portion 112 and second portion 114 increases the forces on the connection to push or create an internal force that further holds the two bodies from moving or compressing past the connection.

In one embodiment, holes 118 and grooves 120 can be placed in any desirable position. Thus, in one embodiment, holes 118 and grooves 120 are preferably positioned such that the pin location is in the wetted or pressurized first portion 112 and second portion 114 of connection assembly 110 and is outside of the pressurized area. However, the pin connection can be used within the pressurized area, without requiring further changes to the method of assembling and disassembling the components and without requiring further changes to the functioning of the assembled construction. In one embodiment, holes 118 do not pass completely through second portion 114, or at least not the entire diameter of holes 118—for example, in one embodiment, a smaller diameter opening can be provided on one end of hole 118 such that pin 116 cannot pass completely through second portion 114, but can still enable a user to pass a punch or other device into it such that the user can force pin 116 back out of hole 118.

Although the drawings illustrate round holes 118, rounded grooves 120 and round pins 116, in one embodiment, all of these can be made to have a different shape, for example, square holes with square grooves and square pins. Of course, any other desired cross-sectional shape can optionally be used and will provide desirable results. Still further, although holes 118, grooves 120, and pins 116 are illustrated as being pairs, in one embodiment, any desirable number can be used.

Figure 2A:
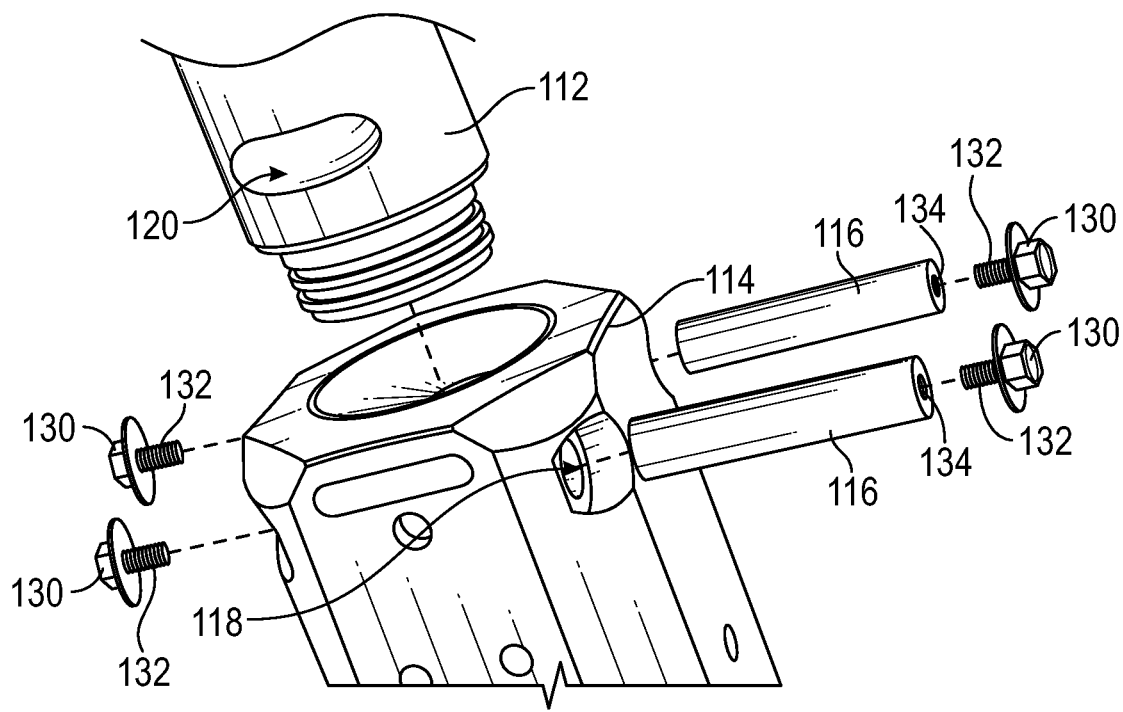
FIG. 2A is a drawing which illustrates a perspective side view of an upper lubricator body positioned above a lower lubricator body with a pair of pins aligned for insertion into receiving holes.
Figure 2B:
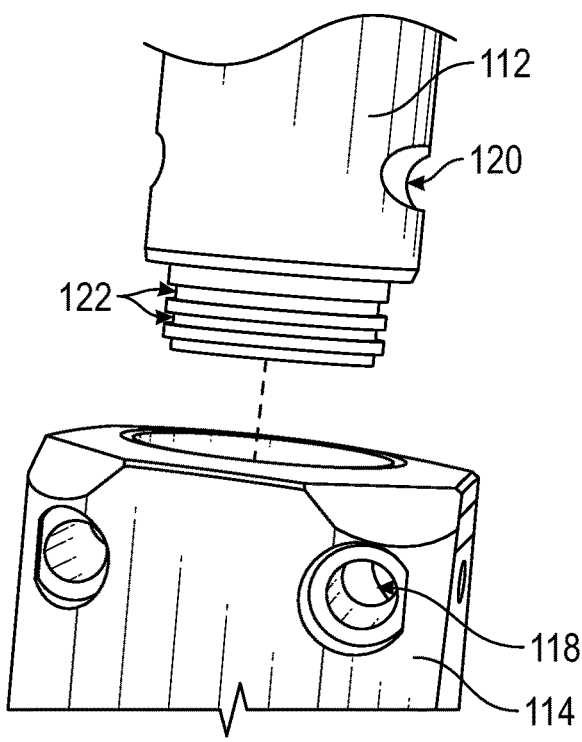
FIG. 2B is a drawing which illustrates a front view of an upper lubricator body positioned above a lower lubricator body so that the position and spacing between the grooves in the upper lubricator body are visible.
Figure 2C:
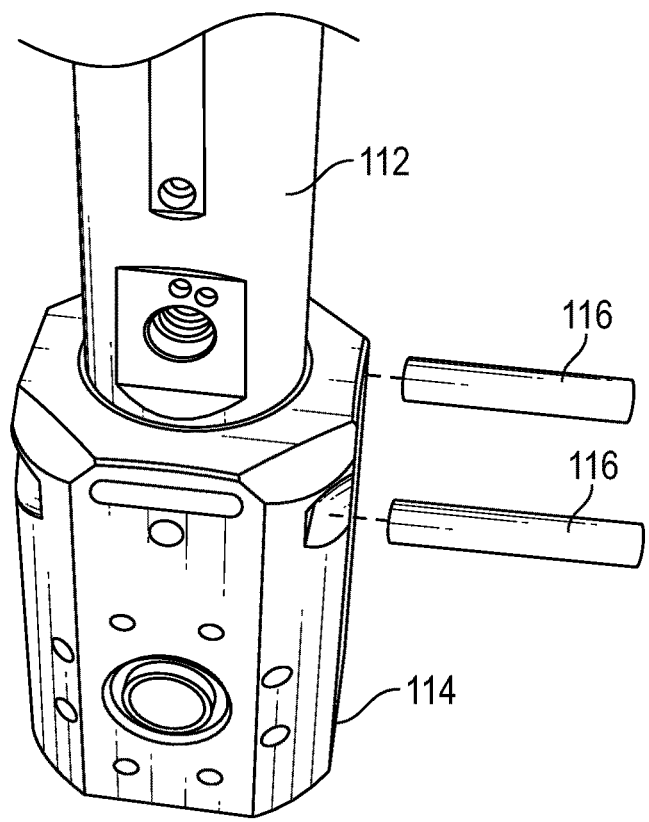
FIG. 2C is a drawing which illustrates a perspective view of an upper lubricator body inserted into a lower lubricator body with a pair of pins aligned for insertion into receiving holes.

As best illustrated in FIG. 2B, a lower portion of first portion 112 comprises one or more (most preferably two) preps 122 for receiving seals, which can include O-rings or pressure activated soft material seals that seal against two or more seal bore faces. Depending on the seal to be used, preps 122 can comprise grooves, channels, or other shapes/structures. The seals can optionally be activated by pressure but can also optionally be mechanically activated through a mechanical form of compression. In one embodiment, seals are preferably disposed below pins 116.

Figure 3A:
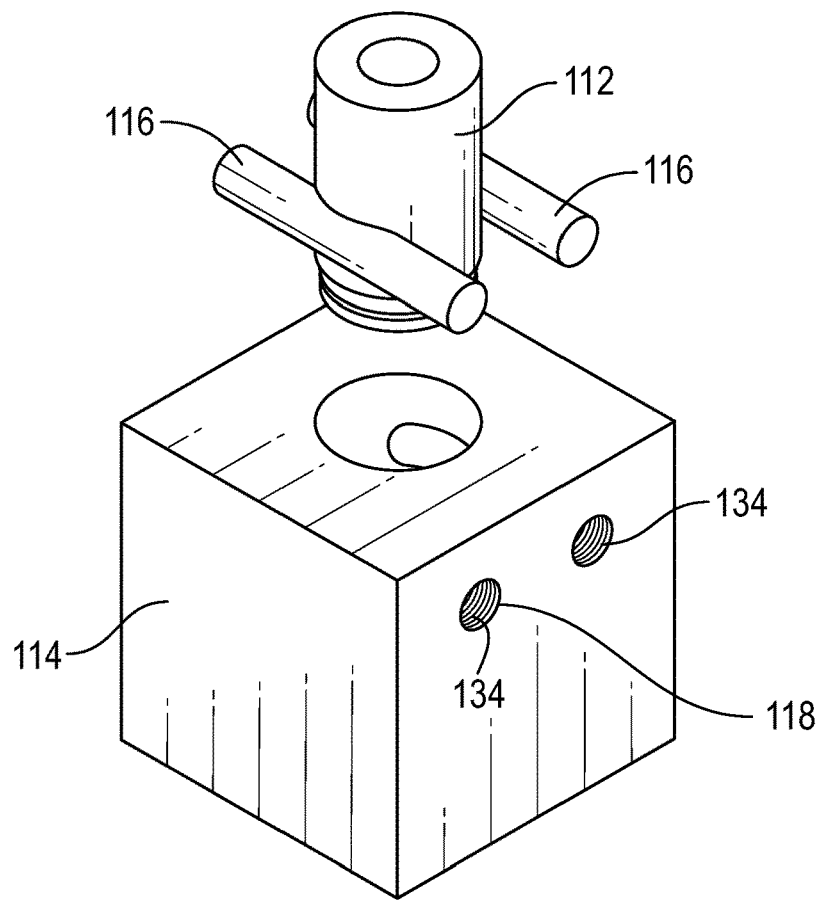
FIG. 3A is a drawing which illustrates simplified perspective view of an upper lubricator body inserted into position above a lower lubricator body with a pair of pins disposed within grooves of the upper lubricator body.
Figure 3B:
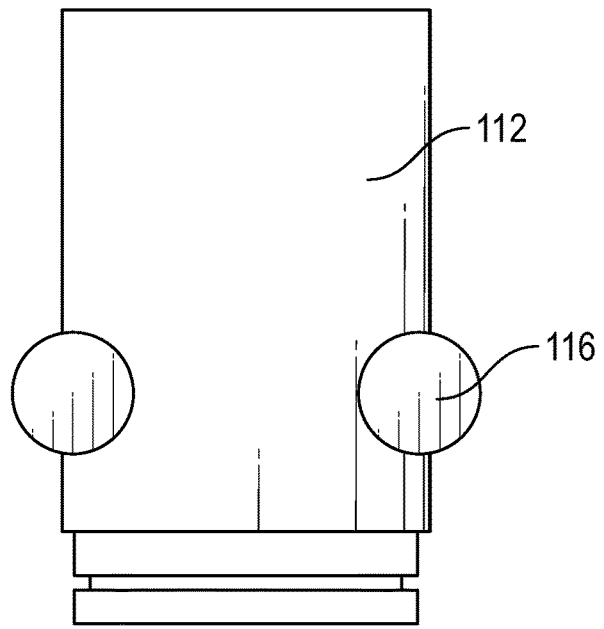
FIG. 3B is a drawing which illustrates a simplified front view wherein a pair of pins positioned within grooves of an upper lubricator body.
Figure 4B:
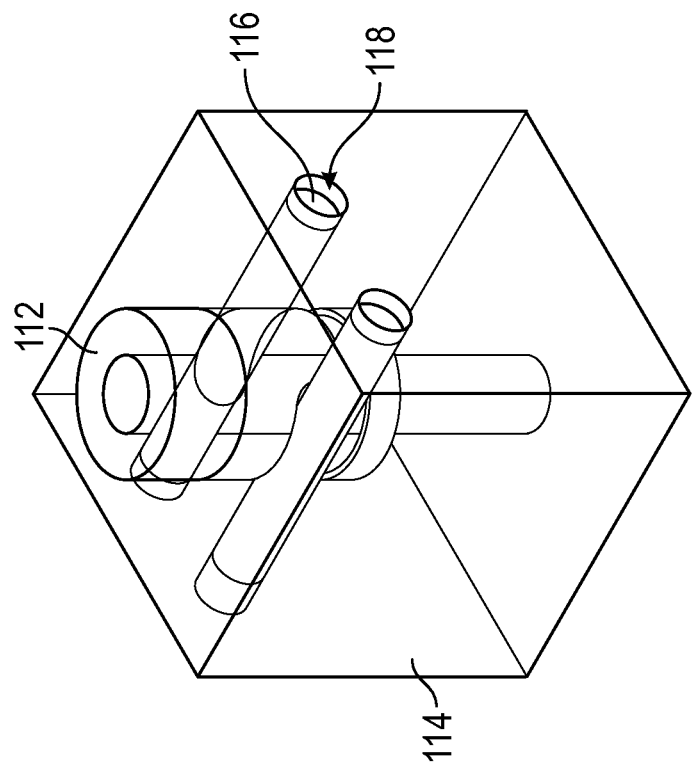
FIG. 4B is a drawing which illustrates a perspective view of upper and lower lubricator bodies connected together with a pair of pins and formed from a transparent material such that the internal structure and interconnection thereof is visible.
Figure 4A:
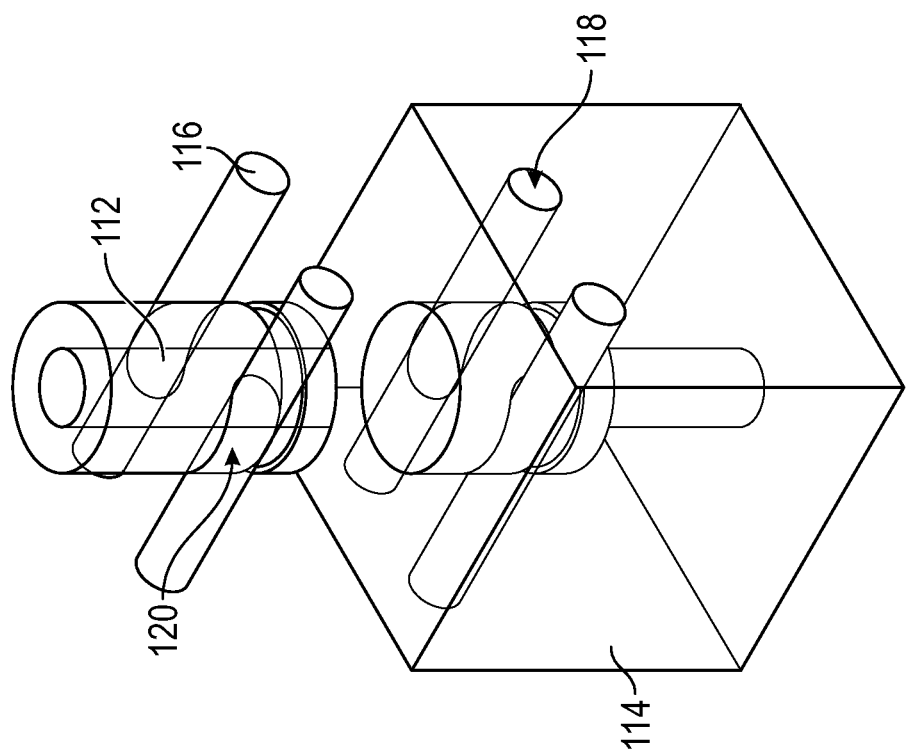
FIG. 4A is a drawing which illustrates a perspective view of upper and lower lubricator bodies disposed apart from one another and formed from a transparent material such that the internal structure thereof is visible.

In one embodiment, pins 116 can be held in place with any desired method and/or apparatus. For example, in one embodiment, clips, bolts, threaded caps, cotter pins, set screws, or one or more other retention devices can be used to hold pins 116 in place within holes 118 and grooves 120. The use of such retention devices does not affect the function or strength of pins 116. As best illustrated in FIG. 2A, screws 130 can be used to hold pins 116 in place once assembled. When screws 130 are used, screws 130 preferably comprise threads 132 and pins 116 can comprise an opening on their end portions which comprise threads 134 to engage with threads 132. Optionally, instead of pins 116 comprising openings with threads, as best illustrated in FIG. 3A, openings 118 can comprise threads 134 for engaging with screws 130. Numerous other configurations for retaining pins 116 can optionally be used—for example, pins 116 can themselves be made sufficiently longer than holes 118 such that end portions of pins 116 protrude from second portion 114 and can comprise threads on their exterior such that a nut can be screwed onto each end of pins 116. In one embodiment, pins 116 can preferably be pressed or punched, by hand, with a punch or with a press, after any retaining device has been removed. Optionally, pins 116 can comprise a head at one end which has a diameter larger than the rest of pins 116 such that the head acts as a stop. By using embodiments of the present invention, parts can be removed and replaced without requiring the removal of the main block or flow tee component.

In one embodiment, connection 110 preferably enables a plunger lift lubricator to be constructed which can accommodate operating pressures of at least about 2,000 pounds per square inch ("psi") and more preferably at least about 10,000 psi and more preferably up to about 20,000 psi. In one embodiment, the primary axis of pin 116 is preferably positioned such that it is tangential to a mating interface of two components. In one embodiment, pins 116 are not positioned such that a force applied thereto would result in sheering of the pins only at an angle that is substantially normal to their primary axis as would be the case for a conventional sheer pin configuration.

Note that in this application, the terms "about", "substantially", or "approximately" mean within twenty percent (20%) of the amount or value given.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A plunger lift lubricator connection assembly comprising:
   a first portion of said plunger lift lubricator;
   a second portion of said plunger lift lubricator;
   said first portion of said plunger lift lubricator configured to be inserted into said second portion of said plunger lift lubricator such that a mating interface is formed between said first portion of said plunger lift lubricator and said second high-pressure portion of said plunger lift lubricator;
   said first portion of said plunger lift lubricator comprising at least one groove;
   at least one opening disposed within said second portion of said plunger lift lubricator, said opening positioned such that a primary axis of said opening passes tangentially through said mating interface of said first portion of said plunger lift lubricator and said second portion of said plunger lift lubricator;
   at least one pin formed from a material having a yield strength of at least 20 thousand pounds per square inch ("KSI");

said at least one pin comprising dimensions that allow it to be at least partially disposed within said at least one opening within said second portion of said plunger lift lubricator and said at least one groove of said first portion of said plunger lift lubricator; and said at least one groove positioned on said first portion of said plunger lift lubricator and said at least one opening positioned on said second portion of said plunger lift lubricator along at least a portion of a mating interface such that said at least one pin can be positioned such that it extends through at least a portion of said at least one opening and through at least a portion of said at least one groove.

2. The connection assembly of claim 1 wherein said at least one opening comprises at least two openings and wherein each of said at least two openings are respectively positioned such that a respective primary axis of said at least two openings passes tangentially through said mating interface of said first portion of said plunger lift lubricator and said second portion of said plunger lift lubricator.

3. The connection assembly of claim 1 further comprising at least one structure to prevent said at least one pin from passing completely through said at least one opening.

4. The connection assembly of claim 3 wherein said structure comprises a threaded fastener.

5. The connection assembly of claim 4 wherein said at least one pin comprises threads disposed on at least one end portion thereof.

6. The connection assembly of claim 4 wherein said at least one opening disposed within said second portion of said plunger lift lubricator comprises threads disposed therein.

7. The connection assembly of claim 1 wherein said first portion of said plunger lift lubricator comprises an upper body of said plunger lift lubricator and wherein said second portion of said plunger lift lubricator comprises a lower body of said plunger lift lubricator.

8. The connection assembly of claim 1 wherein said at least one pin comprises steel having a yield strength of at least 45 KSI.

9. The connection assembly of claim 1 wherein said at least one pin is not formed from a plastic material.

10. The connection assembly of claim 1 wherein said at least one pin is not formed from aluminum.

* * * * *